United States Patent
Uemura

(10) Patent No.: US 9,432,895 B2
(45) Date of Patent: Aug. 30, 2016

(54) TERMINAL APPARATUS, BASE STATION APPARATUS, COMMUNICATION SYSTEM, CELL SELECTION METHOD, AND INTEGRATED CIRCUIT

(71) Applicant: SHARP KABUSHIKI KAISHA, Osaka-shi, Osaka (JP)

(72) Inventor: Katsunari Uemura, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 14/411,043

(22) PCT Filed: Jun. 27, 2013

(86) PCT No.: PCT/JP2013/067621
§ 371 (c)(1),
(2) Date: Dec. 23, 2014

(87) PCT Pub. No.: WO2014/003105
PCT Pub. Date: Jan. 3, 2014

(65) Prior Publication Data
US 2015/0208302 A1  Jul. 23, 2015

(30) Foreign Application Priority Data
Jun. 28, 2012  (JP) .................................. 2012-145245

(51) Int. Cl.
*H04W 36/00* (2009.01)
*H04W 36/08* (2009.01)
(Continued)

(52) U.S. Cl.
CPC ............ *H04W 36/08* (2013.01); *H04W 48/02* (2013.01); *H04W 48/08* (2013.01); *H04W 48/20* (2013.01)

(58) Field of Classification Search
CPC .... H04W 36/30; H04W 36/18; H04W 36/08
USPC ............... 455/436, 442, 435.1, 432.1, 422.1; 370/331
See application file for complete search history.

(56) References Cited

U.S. PATENT DOCUMENTS

| 8,750,880 B2 | 6/2014 | Matsuo et al. |
| 2006/0035662 A1* | 2/2006 | Jeong .................... H04W 48/06 455/525 |

(Continued)

FOREIGN PATENT DOCUMENTS

| EP | 2293606 A1 | 3/2011 |
| EP | 2317795 A1 | 5/2011 |

(Continued)

OTHER PUBLICATIONS

R2-122533, Ericsson, ST-Ericsson "RRC re-establishment in Hetnet HO failure", 3GPP TSG-RAN WG2 #78, Prague, Czech Republic, May 21-25, 2012.

(Continued)

*Primary Examiner* — Nghi H Ly
(74) *Attorney, Agent, or Firm* — Birch, Stewart, Kolasch & Birch, LLP

(57) ABSTRACT

Provided are a terminal apparatus, a base station apparatus, a communication apparatus, a cell selection method, and an integrated circuit in which a cell selection procedure between the mobile station apparatus and the base station apparatus are efficiently performed to improve communication quality. The terminal apparatus determines whether or not a cell detected by the terminal apparatus is suitable for a cell selection candidate on the basis of first cell restriction information indicating cell access restriction that is applied during cell selection, second cell restriction information that is determined by the terminal apparatus whether or not to apply, and a cell measurement result.

9 Claims, 5 Drawing Sheets

(51) Int. Cl.
*H04W 48/02* (2009.01)
*H04W 48/08* (2009.01)
*H04W 48/20* (2009.01)

(56) References Cited

U.S. PATENT DOCUMENTS

| 2010/0296415 | A1  | 11/2010 | Sachs et al. |
| 2011/0105109 | A1* | 5/2011  | Uemura ............ H04W 4/22 455/422.1 |
| 2012/0289274 | A1  | 11/2012 | Matsuo et al. |
| 2012/0295625 | A1  | 11/2012 | Matsuo et al. |

FOREIGN PATENT DOCUMENTS

| JP | 2008-172373 A  | 7/2008 |
| WO | 2011/086927 A1 | 7/2011 |
| WO | 2011/086934 A1 | 7/2011 |

OTHER PUBLICATIONS

R2-122814, Intel Corporation "Impact of random pico cell deployment on the performance", 3GPP TSG RAN WG2 Meeting #78, Prague, Czech Republic, May 21-25, 2012.

* cited by examiner

TERMINAL APPARATUS, BASE STATION APPARATUS, COMMUNICATION SYSTEM, CELL SELECTION METHOD, AND INTEGRATED CIRCUIT

TECHNICAL FIELD

An embodiment of the present invention relates to a technology of a terminal apparatus, a base station apparatus, a communication system, a cell selection method, and an integrated circuit in which a cell selection procedure between the mobile station apparatus and the base station apparatus is effectively performed to improve communication quality.

BACKGROUND ART

In the $3^{rd}$ generation partnership project (3GPP) that is a standardization project, standardization of an orthogonal frequency-division multiplexing (OFDM) communication mode, or Evolved Universal Terrestrial Radio Access (hereinafter, referred to as "EUTRA") that realizes high-speed communication by employing flexible scheduling at a designated frequency and time unit called a resource block has been carried out.

In addition, in 3GPP, Advanced EUTRA in which higher-speed data transmission is realized and has upward compatibility with respect to EUTRA, has been discussed. EUTRA is a communication system based on the assumption of a network in which the base station apparatus has substantially the same cell configuration, but in Advanced EUTRA, a communication system based on the assumption of a network (heterogeneous radio network, heterogeneous network) in which base station apparatuses (cells) having configurations different from each other are mixed in the same area has been discussed. In the communication system on the assumption of the heterogeneous network, there is a possibility that a mobility control function of the mobile station apparatus on the assumption of a communication system of the related art may not correctly operate.

For example, as disclosed in NPL 1, in a case where a mobile station apparatus moves between a cell (for example, a macro cell) having a large cell radius and a cell (for example, pico cell) having a small cell radius by performing hand-over, the probability of failure in the hand-over of a mobile station apparatus that moves at a high speed further increases in comparison to a mobile station apparatus that moves a low speed or a medium speed.

In addition, in a heterogeneous network, a method of shortening a timer that is used for detection of radio resource failure so as to shorten the time necessary for radio resource control connection re-establishment (RRC connection re-establishment) procedure after failure in the hand-over is disclosed in NPL 2.

CITATION LIST

Non Patent Literature

NPL 1: R2-122814, Intel Corporation, Prague, Czech Republic, 21st-25th May 2012. http://www.3gpp.org/ftp/tsg_ran/WG2_RL2/TSGR2_78/Docs/NPL
NPL 2: R2-122533, Ericsson, ST-Ericsson, Prague, Czech Republic, 21st-25th May 2012. http://www.3gpp.org/ftp/tsg_ran/WG2_RL2/TSGR2_78/Docs/

SUMMARY OF INVENTION

Technical Problem

Movement of the mobile station apparatus from a serving cell to a different neighboring cell may occur in a case other than the hand-over. For example, in a case of newly performing cell selection after termination of communication, or in a case of cell selection in the RRC connection re-establishment procedure, movement of the mobile station apparatus from the serving cell to a different neighboring cell may occur. According to this, with regard to the heterogeneous network, in the method of the related art, there is a possibility that a cell that is selected in a cell selection procedure may not be a suitable cell, but this problem is not disclosed in NPL 1 or NPL 2.

In NPL 1, a problem related to the hand-over in the heterogeneous network is pointed out, but a cell selection procedure in a case where the mobile station apparatus newly performs cell selection after termination of communication is not discussed. In addition, a cell selection procedure in a case where the mobile station apparatus restarts from a cell selection procedure due to radio link failure and the like is not discussed.

In NPL 2, only a cell selection time after radio link failure is shortened, and there is a problem that whether or not the mobile station apparatus is capable of selecting an optimal cell in consideration of the heterogeneous network is not guaranteed.

In consideration of the above-described problems, an object of the embodiment of the invention is to provide a technology relating to a terminal apparatus, a base station apparatus, a communication system, a cell selection method, and an integrated circuit in which a cell selection procedure between a mobile station apparatus and a base station apparatus is efficiently performed to improve communication quality.

Solution to Problem (1) To accomplish the above-described object, the following configurations are employed. That is, according to an embodiment of the invention, there is provided a terminal apparatus that communicates with a base station apparatus. The terminal apparatus receives first cell restriction information indicating cell access restriction that is applied during cell selection, and second cell restriction information, which is determined by the terminal apparatus whether or not to apply, from the base station apparatus. The terminal apparatus determines whether or not a cell detected by the terminal apparatus is suitable for a cell selection candidate on the basis of the first cell restriction information, the second cell restriction information, and a cell measurement result.

(2) In addition, the terminal apparatus according to the embodiment of the invention may determine whether or not to apply the second cell restriction information on the basis of estimated speed information of the terminal apparatus.

(3) In addition, the terminal apparatus according to the embodiment of the invention may determine whether or not to apply the second cell restriction information on the basis of physical cell ID information indicating that the cell is not suitable for the cell selection candidate that is configured from the base station apparatus.

(4) In addition, the terminal apparatus according to the embodiment of the invention may determine whether or not to apply the second cell restriction information on the basis of whether or not the terminal apparatus is located in a cell that is indicated by the physical cell ID information configured from the base station apparatus.

(5) In addition, the terminal apparatus according to the embodiment of the invention may regard a cell, in which the cell measurement result satisfies standard quality and access of the terminal apparatus is not restricted in accordance with the first cell restriction information and the second cell restriction information which are applied, as a cell suitable for the cell selection candidate.

(6) In addition, the terminal apparatus according to the embodiment of the invention may acquire the second cell restriction information from broadcast information of a detected cell.

(7) In addition, according to another embodiment of the invention, there is provided a terminal apparatus. The terminal apparatus receives first cell restriction information indicating cell access restriction that is applied during cell selection, and second cell restriction information, which is determined by the terminal apparatus whether or not to apply, from the base station apparatus. In a case of cell selection in a connection re-establishment procedure of radio resource control, the terminal apparatus determines whether or not a cell detected by the terminal apparatus is suitable for a cell selection candidate on the basis of the first cell restriction information, the second cell restriction information, and a cell measurement result.

(8) In addition, the terminal apparatus according to the embodiment of the invention may perform the determination by using area identifier information of the cell detected by the terminal apparatus.

(9) In addition, according to still another embodiment of the invention, there is provided a base station apparatus that communicates with a terminal apparatus. The base station apparatus transmits first cell restriction information indicating cell access restriction that is applied during cell selection, second cell restriction information that is allowed to be determined by the terminal apparatus whether or not to apply, and information related to conditions allowing the terminal apparatus to determine application of the second cell restriction information to the terminal apparatus.

(10) In addition, according to still another embodiment of the invention, there is provided a base station apparatus that communicates with a terminal apparatus. The base station apparatus transmits first cell restriction information indicating cell access restriction that is applied during cell selection, second cell restriction information that is allowed to be determined by the terminal apparatus whether or not to apply, and area identifier information that is used for determination of application of the second cell restriction information to the terminal apparatus.

(11) In addition, according to still another embodiment of the invention, there is provided a communication system provided with a terminal apparatus and a base station apparatus. The base station apparatus transmits first cell restriction information indicating cell access restriction that is applied during cell selection, second cell restriction information that is allowed to be determined by the terminal apparatus whether or not to apply, and information related to conditions allowing the terminal apparatus to determine application of the second cell restriction information to the terminal apparatus. The terminal apparatus determines whether or not a cell detected by the terminal apparatus is suitable for a cell selection candidate on the basis of the first cell restriction information, the second cell restriction information, and a cell measurement result.

(12) In addition, in the communication system according to the embodiment of the invention, the terminal apparatus may determine whether or not to apply the second cell restriction information on the basis of estimated speed information of the terminal apparatus.

(13) In addition, in the communication system according to the embodiment of the invention, the terminal apparatus may determine whether or not to apply the second cell restriction information on the basis of physical cell ID information indicating that the cell is not suitable for the cell selection candidate that is configured from the base station apparatus.

(14) In addition, in the communication system according to the embodiment of the invention, the terminal apparatus may determine whether or not to apply the second cell restriction information on the basis of whether or not the terminal apparatus is located in a cell that is indicated by the physical cell ID information configured from the base station apparatus.

(15) In addition, in the communication system according to the embodiment of the invention, the terminal apparatus may regard a cell, in which the cell measurement result satisfies standard quality and access of the terminal apparatus is not restricted in accordance with the first cell restriction information and the second cell restriction information which are applied, as a cell suitable for the cell selection candidate.

(16) In addition, according to still another embodiment of the invention, there is provided with a communication system including a terminal apparatus and a base station apparatus. The base station apparatus transmits first cell restriction information indicating cell access restriction that is applied during cell selection, second cell restriction information that is allowed to be determined by the terminal apparatus whether or not to apply, and area identifier information that is used for determination of application of the second cell restriction information to the terminal apparatus. In a case of cell selection in a connection re-establishment procedure of radio resource control, the terminal apparatus determines whether or not a cell detected by the terminal apparatus is suitable for a cell selection candidate on the basis of the first cell restriction information, the second cell restriction information, and a cell measurement result.

(17) In addition, in the communication system according to the embodiment of the invention, the terminal apparatus may perform the determination by using area identifier information of the cell detected by the terminal apparatus.

(18) In addition, according to a still another embodiment of the invention, there is provided a cell selection method in a communication system provided with a terminal apparatus and a base station apparatus. The method includes: transmitting first cell restriction information indicating cell access restriction that is applied during cell selection, second cell restriction information that is allowed to be determined by the terminal apparatus whether or not to apply, and information related to conditions allowing the terminal apparatus to determine application of the second cell restriction information from the base station apparatus to the terminal apparatus; and determining by the terminal apparatus whether or not a cell detected by the terminal apparatus is suitable for a cell selection candidate on the basis of the first cell restriction information, the second cell restriction information, and a cell measurement result.

(19) In addition, according to still another embodiment of the invention, there is provided a cell selection method in a communication system provided with a terminal apparatus and a base station apparatus. The method includes: transmitting first cell restriction information indicating cell access restriction that is applied during cell selection, second cell restriction information that is allowed to be determined by the terminal apparatus whether or not to apply, and area identifier information that is used for determination of application of the second cell restriction information from the base station apparatus to the terminal apparatus; and determining by the terminal apparatus whether or not a cell detected by the terminal apparatus is suitable for a cell selection candidate on the basis of the first cell restriction information, the second cell restriction information, and a cell measurement result, in a case of cell selection in a connection re-establishment procedure of radio resource control.

(20) In addition, according to still another embodiment of the invention, there is a provided an integrated circuit mounted on a terminal apparatus that communicates with a base station apparatus. The integrated circuit allows the terminal apparatus to execute a function of receiving first cell restriction information indicating cell access restriction that is applied during cell selection, and second cell restriction information, which is determined by the terminal apparatus whether or not to apply, from the base station apparatus, and a function of determining whether or not a cell detected by the terminal apparatus is suitable for a cell selection candidate on the basis of the first cell restriction information, the second cell restriction information, and a cell measurement result.

(21) In addition, according to still another embodiment of the invention, there is provided an integrated circuit mounted on a terminal apparatus that communicates with a base station apparatus. The integrated circuit allows the terminal apparatus to execute a function of receiving first cell restriction information indicating cell access restriction that is applied during cell selection, and second cell restriction information that is allowed to be determined by the terminal apparatus whether or not to apply from the base station apparatus, and a function of determining whether or not a cell detected by the terminal apparatus is suitable for a cell selection candidate on the basis of the first cell restriction information, the second cell restriction information, and a cell measurement result, in a case of cell selection in a connection re-establishment procedure of radio resource control.

In this specification, respective embodiments in a technology of a terminal apparatus, a base station apparatus, a communication system, a cell selection method, and an integrated circuit which realize an efficient cell selection procedure are disclosed, but a communication type applicable to the respective embodiments is not limited to the communication type such as EUTRA and Advanced EUTRA having upward compatibility with EUTRA.

For example, the technology described in this specification can be used in various communication systems such as a code division multiple access (CDMA) system, a time division multiple access (TDMA) system, a frequency division multiple access (FDMA) system, an orthogonal FDMA (OFDMA) system, a single carrier FDMA (SC-FDMA) system, and the other systems. In addition, in this specification, the terms a system and a network may be used synonymously.

In addition, a technology of dealing a plurality of frequencies (component carriers or frequency bands) of different frequency bands as one frequency (frequency band) by aggregating the frequencies using carrier aggregation is applicable to the mobile station apparatus and the base station apparatus. The component carriers include an uplink component carrier corresponding to an uplink, and a downlink component carrier corresponding to a downlink.

For example, in a case of aggregating five component carriers having a frequency bandwidth of 20 MHz through the carrier aggregation, a mobile station apparatus capable of performing the carrier aggregation performs transmission and reception by regarding these carriers so as to have one frequency bandwidth of 100 MHz. In addition, the component carriers that are aggregated may be contiguous frequencies or frequencies in which the entireties or parts thereof are not contiguous. For example, in a case where a frequency band that can be used is an 800 MHz band, a 2 GHz band, and a 3.5 GHz band, a component carrier may be transmitted in the 800 MHz band, another component carrier may be transmitted in the 2 GHz band, and still another component carrier may be transmitted in the 3.5 GHz band.

In addition, a plurality of contiguous or non-contiguous component carriers in the same frequency band may be aggregated. The frequency bandwidth of each component carrier may be a frequency bandwidth (for example, 5 MHz or 10 MHz) narrower than a frequency bandwidth (for example, 20 MHz) which the mobile station apparatus can receive, and frequency bandwidths that are aggregated may be different from each other. It is preferable that the frequency bandwidth be the same as any frequency bandwidth of a cell in the related art in consideration of backward compatibility, but may be different from the frequency bandwidth of the cell. In addition, a component carrier without the backward compatibility is also possible. In addition, it is preferable that the number of uplink component carriers that are allocated (configured, added) to the mobile station apparatus by the base station apparatus be equal to or less than the number of downlink component carriers.

Advantageous Effects of Invention

According to the embodiments of the invention, it is possible to provide a technology relating to a terminal apparatus, a base station apparatus, a communication system, a cell selection method, and an integrated circuit in which a cell selection procedure between a mobile station apparatus and a base station apparatus is efficiently performed to improve communication quality.

DESCRIPTION OF EMBODIMENTS

Figure 1:
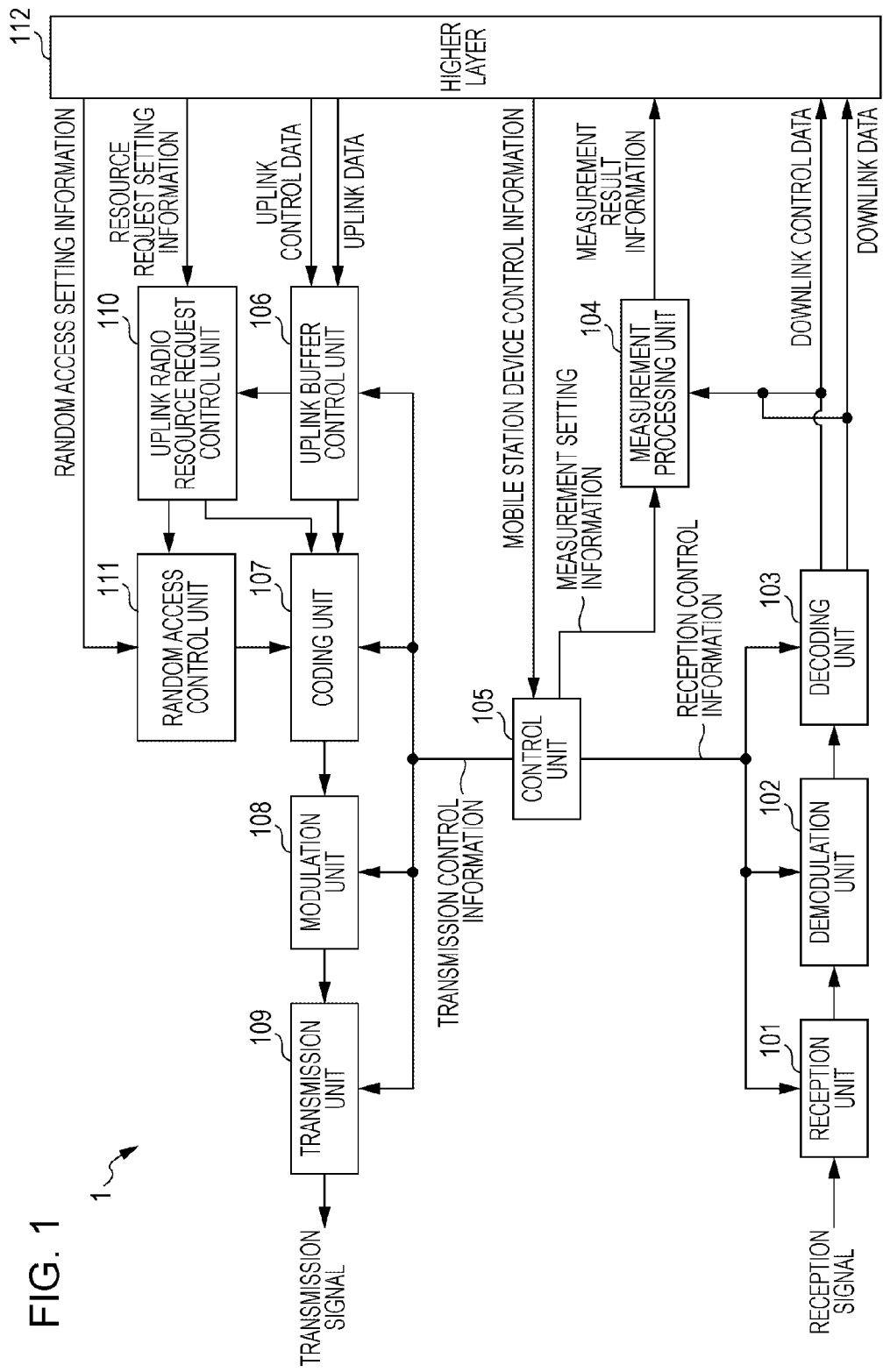
FIG. 1 is a block diagram illustrating an example of a schematic configuration of a mobile station apparatus according to embodiments of the invention.

Prior to description of respective embodiments of the invention, a technology relating to the respective embodiments of the invention will be briefly described.

[Physical Channel/Physical Signal]

Main physical channel and physical signal that are used in EUTRA and Advanced EUTRA will be described. A channel represents a medium that is used for transmission of signals, and the physical channel represents a physical medium that is used for transmission of signals. In the invention, the physical channel can be used synonymously with a signal. There is a possibility that in EUTRA and Advanced EUTRA, the physical channel may be added, or a structure or a format type of the physical channel may be changed or added in the future. However, even in a case of change or addition, this case has no effect on a description of respective embodiments of the invention.

In EUTRA and Advanced EUTRA, scheduling of the physical channel/physical signal is managed by using a radio frame. One radio frame is 10 ms, and the one radio frame is constituted by 10 sub-frames. In addition, one sub-frame is constituted by two slots (that is, one sub-frame is 1 ms, and one slot is 0.5 ms). In addition, management is performed by using a resource block as the minimum unit of scheduling in which physical channels are arranged. The resource block is defined as a constant frequency domain in which a frequency axis is constituted by an assembly of a plurality of sub-carriers (for example, 12 sub-carriers) and a domain in which the frequency axis is constituted by a constant transmission time interval (one slot).

Synchronization signals are constituted by three kinds of primary synchronization signals, and secondary synchronization signals constituted by 31 kinds of codes that are arranged differently from each other in a frequency domain. 504 kinds of cell identifiers (physical cell identity (ID): PCI) that identify a base station apparatus, and a frame timing for radio synchronization are shown due to a combination of signals of the primary synchronization signals and the secondary synchronization signals. A mobile station apparatus specifies the physical cell ID of the synchronization signals that are received by cell search.

A physical notification information channel (PBCH; Physical Broadcast Channel) is transmitted for notification (configuration) of a control parameter (broadcast information (system information)) that is commonly used in mobile station apparatuses in a cell. With regard to the broadcast information that is not provided for notification by the physical broadcast information channel, notification of a radio resource is performed by a physical downlink control channel, and the radio resource is transmitted as a Layer 3 message (system information) by a physical downlink shared channel. As the broadcast information, a cell global identifier (CGI) that represents an individual cell identifier, a tracking area identifier (TAI) that manages a standby area according to paging, random access configuration information (transmission timing timer and the like), common radio resource configuration information, and the like are provided for notification.

A downlink reference signal is divided into a plurality of types in accordance with a use thereof. For example, a cell-specific reference signal (RS) is a pilot signal that is transmitted for each cell with a predetermined power, and is a downlink reference signal that is periodically repeated in a frequency domain and a time domain on the basis of a predetermined rule. The mobile station apparatus measures reception quality for each cell by receiving the cell-specific RS. In addition, the mobile station apparatus uses a down cell-specific RS as a reference signal for demodulation of a physical downlink control channel or a physical downlink shared channel which is transmitted simultaneously with the cell-specific RS. As a procedure that is used in the cell-specific RS, a procedure, which can be identified for each cell, is used.

In addition, the downlink reference signal is also used to estimate a downlink channel variation. The downlink reference signal that is used to estimate the channel variation is referred to as a channel state information reference signal (CSI-RS). In addition, a downlink reference signal that is individually configured for each mobile station apparatus is referred to as a UE specific reference signal (URS) or dedicated RS (DRS), and is referenced for a channel compensation process during demodulation of the physical downlink control channel or the physical downlink shared channel.

The physical downlink control channel (PDCCH) is transmitted as several OFDM symbols (for example, one to four OFDM symbols) from the beginning of each sub-frame, and is used to give an instruction about radio resource allocation information according to scheduling of the base station apparatus and an adjustment amount of increase and decrease in transmission power to the mobile station apparatus.

It is necessary for the mobile station apparatus to acquire radio resource allocation information such as an uplink grant during transmission and a downlink grant (downlink assignment) during reception from the physical downlink control channel by monitoring the physical downlink control channel addressed to its own station apparatus before transmitting and receiving a Layer 3 message (paging, hand-over command, and the like) that is downlink data or downlink control data, and by receiving the physical downlink control channel addressed to its own station. In addition, in addition to the transmission as the above-described ODFM symbols, the physical downlink control channel may be configured to be transmitted as a resource block region that can be individually (dedicatedly) allocated to the mobile station apparatus from the base station apparatus.

A physical uplink control channel (PUCCH) is used to give a reception confirmation response (ACK/NACK; Acknowledgement/Negative Acknowledgement) of data transmitted on the physical downlink shared channel, to give downlink channel (channel state) information (CSI), or to make a scheduling request (SR) that is a radio resource allocation request (radio resource request) of the uplink.

CSI includes a channel quality indicator (CQI), a precoding matrix indicator (PMI), a precoding type indicator (PTI), and a rank indicator (RI). The respective indicators may be described as indications, but a use and meaning thereof are the same in each case.

A physical downlink shared channel (PDSCH) is also used to notify the mobile station apparatus of broadcast information (system information) that is not provided for notification by paging or the physical broadcast information channel as a Layer 3 message in addition to the downlink data. Radio resource allocation information of the physical downlink shared channel is shown on the physical downlink control channel. The physical downlink shared channel is arranged and transmitted in an OFDM symbol other than the OFDM symbol with which the physical downlink control channel is transmitted. That is, the physical downlink shared channel and the physical downlink control channel is time-division multiplexed in one sub-frame.

A physical uplink shared channel (PUSCH) mainly transmits uplink data and uplink control data, and may include reception quality of the downlink or control data such as ACK/NACK. In addition, the physical uplink shared channel is also used to notify the base station apparatus of uplink control information as a Layer 3 message in addition to the uplink data. In addition, as is the case with the downlink, radio resource allocation information of the physical uplink shared channel is shown on the physical downlink control channel.

An uplink reference signal (also, referred to as an uplink pilot signal or an uplink pilot channel) includes a demodulation reference signal (DMRS) that is used by the base station apparatus to demodulate the physical uplink control channel PUCCH and/or the physical uplink shared channel PUSCH, and a sounding reference signal (SRS) that is used by the base station apparatus to mainly estimate a channel state of the uplink. In addition, examples of the sounding reference signal include a periodic sounding reference signal (periodic SRS) and an aperiodic sounding reference signal (aperiodic SRS).

A physical random access channel (PRACH) is a channel that is used to give a notification of (to configure) a preamble sequence and includes guard time. The preamble sequence is configured to express information of six bits by preparing 64 kinds of sequences. The physical random access channel is used as access means of the mobile station apparatus to the base station apparatus. The mobile station apparatus uses the physical random access channel to request a radio source when the physical uplink control channel is not configured, or to make a request for the base station apparatus to transmit transmission timing adjustment information (also, referred to as timing advance (TA)) necessary to align an uplink transmission timing to a reception timing window of the base station apparatus.

Specifically, the mobile station apparatus transmits the preamble sequence by using a radio resource for the physical random access channel that is configured by the base station apparatus. The mobile station apparatus, which receives the transmission timing adjustment information, configures a transmission timing timer (TA timer) that counts effective time of the transmission timing adjustment information that is commonly configured in accordance with broadcast information (or individually configured by a Layer 3 message), and manages an uplink state as a transmission timing adjustment state for effective time (during counting) of the transmission timing timer, and as a transmission timing non-adjustment state (transmission timing non-adjustment state) during a period other than an effective period (during stopping).

The Layer 3 message is a message of a control-plane which is interchanged between RRC (radio resource control) layers of the mobile station apparatus and the base station apparatus, and is used synonymously with an RRC signaling or an RRC message. In addition, the other physical channels are not involved with respective embodiments of the invention, and thus detailed description thereof will be omitted.

[Radio Network]

A communication-possible range (communication area) of each frequency controlled by the base station apparatus is regarded as a cell. At this time, a communication area that is covered by the base station apparatus may have a different size or a different shape in each frequency. In addition, the area that is covered may be different in each frequency. A radio network, in which cells with different kinds of base station apparatuses or different sizes of cell radii are mixed in the same frequency, and constitute one communication system, is referred to as a heterogeneous network.

The mobile station apparatus operates by regarding an area in a cell as a communication area. When the mobile station apparatus moves from a cell to a different cell, the mobile station apparatus moves to another suitable cell in accordance with a cell re-selection procedure during non-radio connection (during non-communication), and a handover procedure during radio connection (during communication). Typically, the suitable cell is determined as a cell to which access of the mobile station apparatus is not prohibited on the basis of information designated from the base station apparatus, and in which downlink reception quality satisfies a designated condition.

In addition, the carrier aggregation is communication with a plurality of cells by using a plurality of component carriers (frequency bands), and is also referred to as cell aggregation. In addition, the mobile station apparatus may be radio-connected to the base station apparatus through a relay station apparatus (or repeater) for each frequency. That is, the base station apparatus of the respective embodiments of the invention may be substituted with a relay station apparatus.

The base station apparatus, which is defined by 3GPP, is referred to as NodeB, and the base station apparatus in EUTRA and Advanced EUTRA is referred to as eNodeB. In addition, the mobile station apparatus in EUTRA and Advanced EUTRA, which are defined by 3GPP, is referred to as user equipment (UE). The base station apparatus manages a cell that is an area in which the mobile station apparatus can communicate with the base station apparatus for each frequency. The cell is also referred to as a macro cell, a femto cell, a pico cell, or a nano cell in accordance with the size of the area in which communication with the mobile station apparatus is possible. In addition, when the mobile station apparatus can establish communication with an arbitrary base station apparatus, among cells of the base station apparatus, a cell that is used for communication with the mobile station apparatus is a serving cell, and the other cells are referred to as neighboring cells.

[Cell Selection Procedure]

A cell selection procedure is executed in a state in which the mobile station apparatus does not camp in any cell. The mobile station apparatus receives a synchronization signal according to a cell search procedure, identifies a physical cell ID of a cell, and detects (senses) the cell.

In addition, the mobile station apparatus classifies a cell that is identified into any one of the following cells (1) to (4) on the basis of a measurement result of a downlink reference signal of each of the identified cells, indication (cell state information) indicating a cell state that is shown on a physical broadcast information channel of the identified cell, and access class restriction information that is used for determination of whether or not access of a mobile station apparatus which is indicated by the broadcast information of the identified cell is permitted. (1) A suitable cell (also referred to as an appropriate cell) in which camping is possible and which has no restriction on service, (2) a cell (acceptable cell) to which access is possible, and in which camping is possible, but a cell with restriction on service exists, (3) a barred cell (also referred to as a restricted cell) in which camping is also prohibited, and (4) a reserved cell which can be used by a specific operator.

In the cell to which access is possible, only emergency call is permitted as service provided to the mobile station apparatus. In addition, the reserved cell may be determined as a suitable cell on the basis of an access class of the mobile station apparatus. For example, in a case where the access class of the mobile station apparatus represents a terminal exclusive for an operator, the reserved cell may be regarded as a cell selection candidate.

Additional conditions for the suitable cell are as follows. It is necessary for the suitable cell to belong to a public land mobile network (PLMN) (public land mobile communication network) that is supported by the mobile station apparatus. In addition, it is necessary for the suitable cell not to belong to PLMN described in a loaming prohibition area list. In addition, in a case where the suitable cell is a cell (closed subscriber group (CSG) cell) which limits a mobile station apparatus that can access the cell, it is necessary the mobile station apparatus to be capable of accessing the CSG cell.

In a case where the suitable cell is detected, the mobile station apparatus selects the cell and camps in the cell, and terminates the cell selection procedure. In addition, in a case where the suitable cell is not detected, the mobile station apparatus selects a cell to which access is possible and camps in the cell, and terminates the cell selection procedure. In a case where both the suitable cell and the cell to which access is possible are not detected, the mobile station apparatus continues the cell selection procedure.

In addition, in a case of detecting occurrence of a failure in which RRC connection is continuously impossible, the cell selection procedure is executed as a part of an RRC connection re-establishment procedure so as to recover the failure. In a case of detecting a failure in which the RRC connection is continuously impossible, the mobile station apparatus initiates the RRC connection re-establishment procedure and attempts the RRC connection re-establishment so as to recover the failure. For example, in a case of detecting radio link failure at lower layer (PHY, MAC, RLC), the mobile station apparatus initiate the RRC connection re-establishment procedure. In addition, in a case of detecting hand-over failure, the mobile station apparatus initiates the RRC connection re-establishment procedure. In addition, in a case where the mobile station apparatus fails to confirm integrity of an RRC message, the mobile station apparatus initiates the RRC connection re-establishment procedure. In addition, in a case where the mobile station apparatus detects failure of RRC connection re-configuration, the mobile station apparatus initiates the RRC connection re-establishment procedure.

The mobile station apparatus, which initiates the RRC connection re-establishment procedure, returns a current radio channel configuration and the like to a default state, and activates a protective timer until the suitable cell is selected. In addition, in a case of selecting the suitable cell before a protective timer expires, the mobile station apparatus initiates a random access procedure with respect to the suitable cell that is selected. Furthermore, in a case where the random access procedure is successful, the mobile station apparatus transmits an RRC connection re-establishment request message to the suitable cell.

On the other hand, in a case where the suitable cell is not selected before the protective timer expires. The mobile station apparatus opens connection of radio resource control, transitions an RRC state from a connection state to an idle state, and continues the cell selection procedure.

In addition, after the mobile station apparatus terminates communication with the base station apparatus, that is, when the mobile station apparatus transitions the RRC state from the connection state to the idle state, and selects a cell in which the mobile station apparatus newly camps, the cell selection procedure is executed.

Appropriate embodiments of the invention will be described in detail with reference to the attached drawings in consideration of the above-described circumstances. In addition, in the description of the embodiments of the invention, in a case where it is determined that a specific description with respect to a known function or configuration relating to the embodiments of the invention makes the gist of the embodiments of the invention ambiguous, the detailed description will be omitted.

First Embodiment

A first embodiment of the invention will be described below. This embodiment relates a cell selection method in a case where information related to extended cell restriction is applied to the mobile station apparatus.

FIG. 1 is a block diagram illustrating an example of a mobile station apparatus 1 according to the first embodiment of the invention. The mobile station apparatus 1 includes a reception unit 101, a demodulation unit 102, a decoding unit 103, a measurement processing unit 104, a control unit 105, an uplink buffer control unit 106, a coding unit 107, a modulation unit 108, a transmission unit 109, an uplink radio resource request control unit 110, a random access control unit 111, and a higher layer 112. The higher layer 112 is a block that realizes a specific function of a radio resource control (RRC) layer that performs radio resource control. In addition, the uplink buffer control unit 106, the uplink radio resource request control unit 110, and the random access control unit 111 are blocks that realize a specific function of a medium access control (MAC) layer that manages a data link layer.

In addition, the mobile station apparatus 1 may include a plurality of reception-based blocks (the reception unit 101, the demodulation unit 102, the decoding unit 103) so as to support simultaneous reception of a plurality of frequencies (frequency bands, frequency bandwidths) by carrier aggregation, and a plurality of transmission-based blocks (the coding unit 107, the modulation unit 108, the transmission unit 109) so as to support simultaneous transmission of a plurality of frequencies (frequency bands, frequency bandwidths).

With regard to reception, mobile station apparatus control information is input to the control unit 105 from the higher layer 112. The mobile station apparatus control information is information which is configured in accordance with reception control information and transmission control information and is necessary for radio communication control of the mobile station apparatus 1. The mobile station apparatus control information is configured by a radio connection resource configuration that is individually transmitted from the base station apparatus 2, cell-specific broadcast information, or system parameters, and is input to the control unit 105 by the higher layer 112 as necessary. The control unit 105 appropriately inputs the reception control information that is reception-related control information to the reception unit 101, the demodulation unit 102, and the decoding unit 103.

The reception control information includes information such as DRX control information, reception timing related to each channel, a multiplexing method, and radio resource arrangement information in addition to information regarding a reception frequency band. In addition, the control unit 105 inputs measurement configuration information necessary for control related to cell measurement to the measurement processing unit 104. The measurement configuration information is information including measurement event information for measurement event determination of whether or not a measurement result of a serving cell and a neighboring cell which is obtained by measurement performed by the mobile station apparatus 1 satisfies a designated measurement event. In addition, the measurement configuration information is information including neighboring cell information for determination of whether or not a measurement result of the neighboring cell which is obtained by measurement performed by the mobile station apparatus 1 satisfies a selection criterion relating to cell selection.

The reception signal is received in the reception unit 101. The reception unit 101 receives the signal with a frequency band designated by the reception control information. The signal that is received is input to the demodulation unit 102. The demodulation unit 102 demodulates the reception signal, and inputs the signal to the decoding unit 103 to correctly decode downlink data and downlink control data. Each piece of data is that is decoded is input to the higher layer 112. Each piece of data is also input to the measurement processing unit 104.

In addition, the measurement processing unit 104 measures reception quality (SIR, SINR, RSRP, RSRQ, RSSI, pass loss, and the like) of a downlink reference signal of a neighboring cell (component carrier) that is detected to create a necessary measurement result. The measurement processing unit 104 uses the measurement result as cell quality information for determination of whether or not a measurement event is successful on the basis of measurement event information that is configured. In addition, the measurement processing unit 104 uses the measurement result as quality information for selection criterion of cell selection or cell re-selection on the basis of neighboring cell information that is configured.

Figure 3:
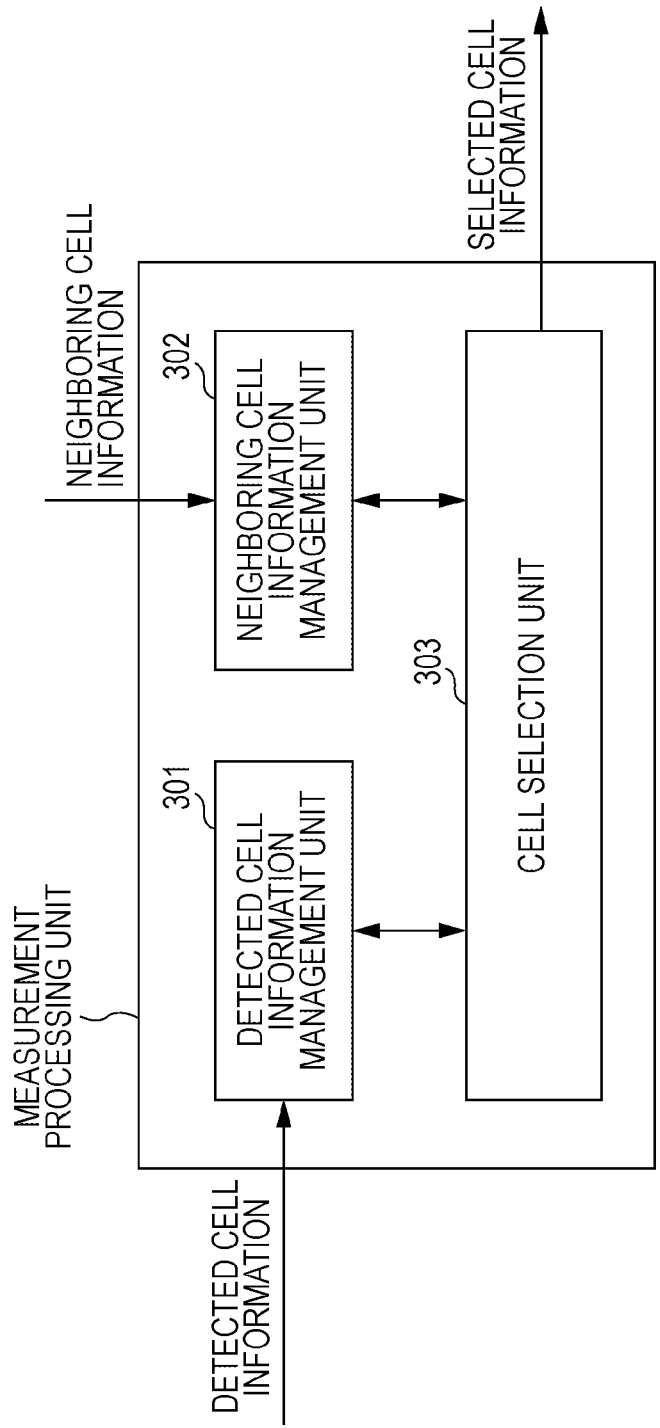
FIG. 3 is a block diagram illustrating an example of a schematic configuration of a measurement processing unit of a mobile station apparatus according to a first embodiment of the invention.

As shown in FIG. 3, the measurement processing unit 104 includes at least a detected cell information management unit 301 that stores detected cell information including information (a physical cell ID or cell measurement quality) of a cell that is detected by cell searching, a neighboring cell information management unit 302 that stores neighboring cell information input from the higher layer 112, and a cell selection unit 303 which compares cell information in the detected cell information management unit 301 and cell information in the neighboring cell information management unit 302, and selects (re-selects) a suitable cell. The cell selection unit 303 selects a cell which is being suitable for camping of the mobile station apparatus on the basis of each piece of information that is input, and inputs selected cell information including the information of the selected cell to the higher layer 112 as measurement result information.

In addition, with regard to transmission, mobile station apparatus control information that is a control parameter for control of each block is input to the control unit 105 from the higher layer 112, and transmission control information that is transmission-related control information is appropriately input to the uplink buffer control unit 106, the coding unit 107, the modulation unit 108, and the transmission unit 109. The transmission control information includes information such as DTX control information, coding information, modulation information, information regarding a transmission frequency band, transmission timing relating to each channel, a multiplexing method, and radio resource arrangement information as uplink scheduling information of the transmission signal.

Random access configuration information is input to the random access control unit 111 from the higher layer 112. The random access configuration information includes preamble information, radio resource information (a power adjustment parameter, the maximum number of times of preamble retransmission, and the like) for physical random access channel transmission, and the like. In addition, the higher layer 112 manages transmission timing adjustment information that is used to adjust uplink transmission timing and a transmission timing timer, and manages an uplink transmission timing state (a transmission timing adjustment state or a transmission timing non-adjustment state) for each cell (or for each cell group, for each TA group). The transmission timing adjustment information and the transmission timing timer are included in the transmission control information.

In addition, in a case where it is necessary to manage a plurality of uplink transmission timing states, the higher layer 112 manages transmission timing adjustment information, which corresponds to an uplink transmission timing of each of a plurality cells (or cell groups, TA groups).

Transmission data (uplink data and uplink control data) which occur are input to the uplink buffer control unit 106 from the higher layer 112 at an arbitrary timing. At this time, the uplink buffer control unit 106 calculates the amount of transmission data that is input (amount of uplink buffers). Resource request configuration information is configured in the uplink radio resource request control unit 110 from the higher layer 112. The resource request configuration information includes at least transmission counter configuration information and radio resource request prohibition timer information. In addition, when transmission data is input to the uplink buffer control unit 106, the uplink buffer control unit 106 notifies the uplink radio resource request control unit 110 of occurrence of transmission data for notification of presence of transmission data in the uplink buffer.

The uplink radio resource request control unit 110 determines whether or not a radio resource necessary for transmission of transmission data that is input is allocated. The uplink radio resource request control unit 110 selects any one of a physical uplink shared channel PUSCH, radio resource request by a physical uplink control channel (SR-PUCCH), and a physical random access channel on the basis of radio resource allocation, and makes a request for a control process for transmission of a channel that is selected with respect to the coding unit 107 and/or the random access control unit 111.

That is, in a state in which a radio resource is already allocated, and transmission data can be transmitted with the physical uplink shared channel PUSCH, the coding unit 107 acquires transmission data, which corresponds to a radio resource that is already allocated in response to instruction of the uplink radio resource request control unit 110, from the uplink buffer control unit 106, codes the transmission data, and outputs the resultant coded data to the modulation unit 108. In addition, when the radio resource is not allocated and radio resource request by a physical uplink control channel (SR-PUCCH) is possible, the coding unit 107 codes control data necessary for transmission of SR-PUCCH in response to instruction of the uplink radio resource request control unit 110, and outputs the resultant coded data to the modulation unit 108.

In addition, when the radio resource is not allocated and the radio resource request performed by the physical uplink control channel (SR-PUCCH) is difficult, the coding unit 107 gives an instruction for the random access control unit 111 to initiate a random access procedure. At this time, the coding unit 107 creates a preamble sequence that is transmitted with a physical random access channel on the basis of random access data information that is input from the random access control unit 111. In addition, the coding unit 107 appropriately codes each piece of data in accordance with transmission control information, and outputs the resultant data to the modulation unit 108.

The modulation unit 108 performs an appropriate modulation process on the basis of a channel structure with which an output from the coding unit 107 is transmitted. The transmission unit 109 performs mapping of an output of the modulation unit 108 to a frequency domain, converts a signal of the frequency domain to a signal of a time domain, and carries the resultant signal on a carrier wave of a designated frequency to perform power amplification. In addition, the transmission unit 109 adjusts the uplink transmission timing in accordance with the transmission timing adjustment information for each cell (or each cell group, each TA group) which is input from the higher layer 112. The physical uplink shared channel in which the uplink control data is disposed may include, for example, a Layer 3 message (radio resource control message; RRC message) in addition to user data.

In FIG. 1, the other constituent elements of the mobile station apparatus 1 are omitted because the constituent elements have no particularly strong relation to this embodiment. However, it is apparent that the mobile station apparatus 1 includes a plurality of blocks, which have the other functions necessary for operation, as constituent elements.

Figure 2:
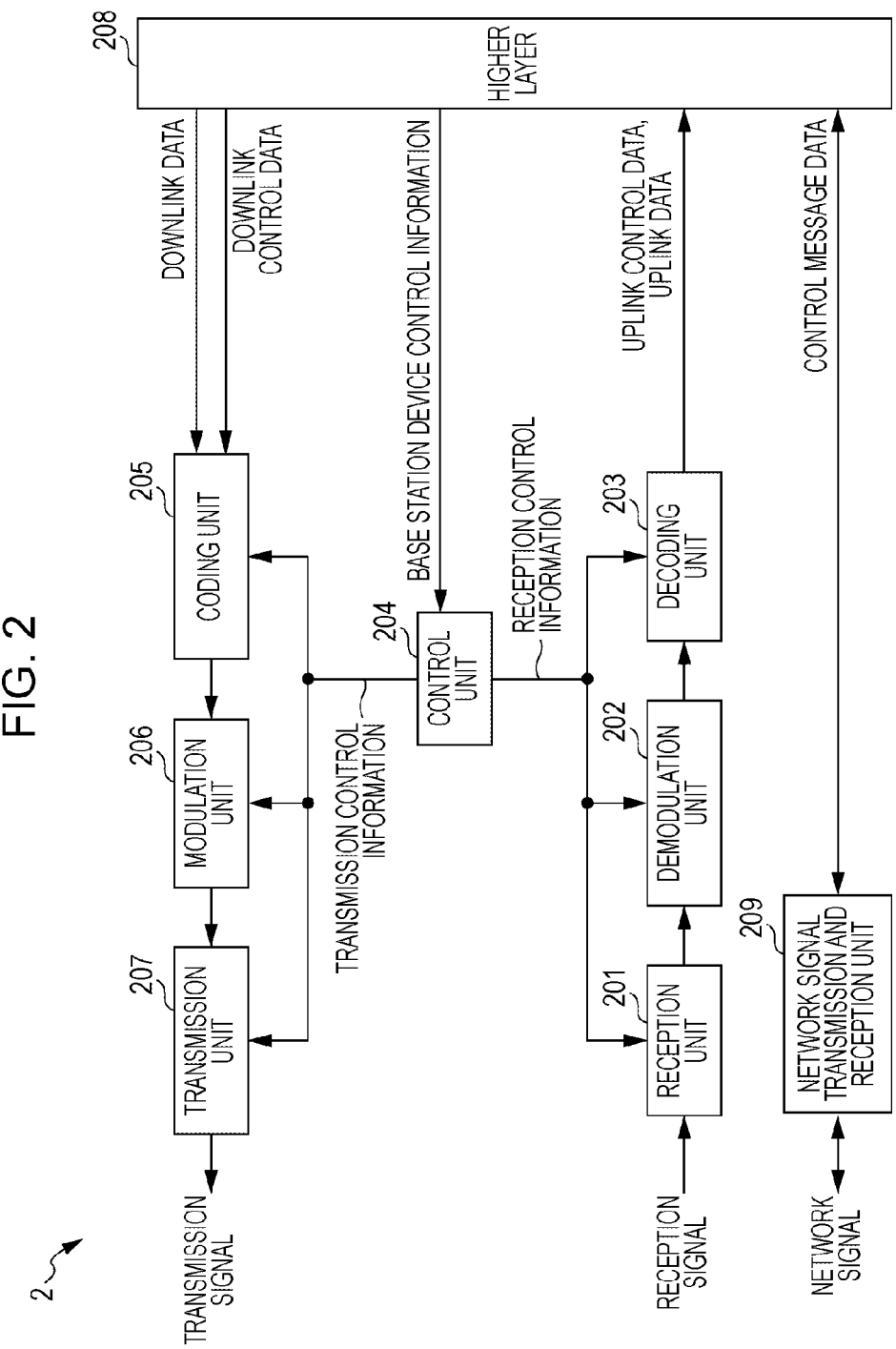
FIG. 2 is a block diagram illustrating an example of a schematic configuration of a base station apparatus according to the embodiments of the invention.

FIG. 2 is a block diagram illustrating an example of the base station apparatus 2 according to the first embodiment of the invention. The base station apparatus includes a reception unit 201, a demodulation unit 202, a decoding unit 203, a control unit 204, a coding unit 205, a modulation unit 206, a transmission unit 207, a higher layer 208, and a network signal transmission and reception unit 209. In addition, the base station apparatus 2 may include a plurality of reception-based blocks (the reception unit 201, the demodulation unit 202, and the decoding unit 203) and a plurality of transmission-based blocks (the coding unit 205, the modulation unit 206, and the transmission unit 207) so as to support a plurality of frequencies (frequency bands, frequency bandwidths).

The higher layer 208 inputs downlink data and downlink control data to the coding unit 205. The coding unit 205 codes the input data and inputs the coded data to the modulation unit 206. The modulation unit 206 performs modulation of a coded signal. In addition, the signal that is output from the modulation unit 206 is input to the transmission unit 207. The transmission unit 207 performs mapping of the input signal to a frequency domain, converts a signal of the frequency domain into a signal of a time domain, and transmits the resultant signal after carrying the signal on a carrier wave of a designated frequency to perform power amplification. The physical downlink shared channel in which the downlink control data is disposed typically constitutes a Layer 3 message (RRC message).

In addition, the reception unit 201 converts the signal received from the mobile station apparatus 1 into a digital signal of a base band. In a case where a cell with a plurality of different transmission timings is configured with respect to the mobile station apparatus 1, the reception unit 201 receives a signal at a different timing for each cell (or for each cell group, for each TA group). The digital signal that is converted in the reception unit 201 is input to the demodulation unit 202 and is demodulated. The signal that is demodulated in the demodulation unit 202 is input to the decoding unit 203 and is decoded, and the decoding unit 203 outputs uplink control data or uplink data that is correctly decoded to the higher layer 208.

Base station apparatus control information, which is necessary for control of each of these blocks, is information which is constituted in accordance with reception control information and transmission control information and which is necessary for radio communication control of the base station apparatus 2. The base station apparatus control information is configured by a higher layer network apparatus (MME or gateway apparatus, OAM) or system parameters, and is input to the control unit 204 by the higher layer 208 as necessary.

The control unit 204 appropriately inputs transmission-related base station apparatus control information to each block of the coding unit 205, the modulation unit 206, and the transmission unit 207 as transmission control information, and the control unit 204 appropriately inputs reception-related base station apparatus control information to each block of the reception unit 201, the demodulation unit 202, and the decoding unit 203 as reception control information. The RRC of the base station apparatus 2 is present as a part of the higher layer 208.

On the other hand, the network signal transmission and reception unit 209 performs transmission or reception of a control message or user data between the base station apparatuses 2 or between a higher layer network apparatus and the base station apparatus 2. In FIG. 2, the other constituent elements of the base station apparatus 2 are omitted because the constituent elements have no particularly strong relation to this embodiment. However, it is apparent that the base station apparatus 2 includes a plurality of blocks, which have other functions necessary for operation, as constituent elements.

Figures 4, 5:
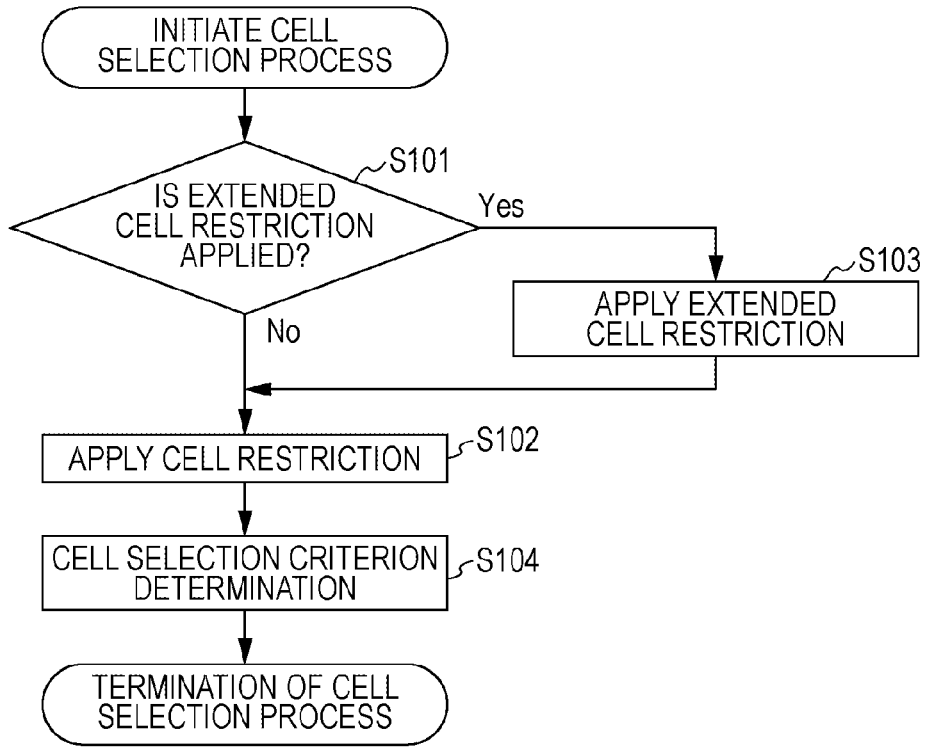
FIG. 4 is a flowchart illustrating an example of a cell selection process of the mobile station apparatus according to the first embodiment of the invention.
FIG. 5 is a diagram illustrating information relating to extended cell restriction according to a second embodiment of the invention.

A cell selection processing method according to the first embodiment of the invention will be described with reference to a flowchart in FIG. 4.

First, in step S101, the mobile station apparatus 1 that initiates a cell selection process determines whether or not an extended cell restriction is applied.

The extended cell restriction represents additional restriction information that is configured to be used by the mobile station apparatus 1 in a cell selection procedure for determination of whether or not a cell is suitable for a cell selection candidate. The mobile station apparatus 1 regards a cell, which matches conditions in the extended cell restriction, as not being a suitable cell. The extended cell restriction may be individually configured from the base station apparatus 2, may be configured as broadcast information for each cell, or may be configured as system parameters. In a case where the extended cell restriction is configured as the broadcast information, the base station apparatus 2 may transmit the extended cell restriction in addition to existing broadcast information, or may transmit the extended cell restriction as new broadcast information. The extended cell restriction is used in combination with typical cell restriction in a cell selection procedure. In addition, typical cell restriction may be referred to as first cell restriction information, and the extended cell restriction may be referred to as second cell restriction information.

The mobile station apparatus 1 may determine whether or not to apply the extended cell restriction on the basis of estimated speed information (also referred to as mobility state estimation (MSE)) of its own station apparatus. As an example, in a case where the estimated speed information of the mobile station apparatus which is estimated by the mobile station apparatus 1 represents a speed other than a low speed, the mobile station apparatus 1 may determine that the extended cell restriction is applied. In this case, when the estimated speed information of its own station apparatus represents a low speed, the mobile station apparatus 1 does not apply the extended cell restriction, and in a case where the estimated speed information of its own station apparatus represents a medium speed or a high speed, the mobile station apparatus 1 may apply the extended cell restriction. In addition, in a case where the estimated speed of its own station apparatus which is estimated by the mobile station apparatus 1 is equal to or higher than the medium speed, the mobile station apparatus 1 may determine that the extended cell restriction is applied. In addition, in a case where the estimated speed of its own station apparatus which is estimated by the mobile station apparatus 1 is a high speed, the mobile station apparatus 1 may determine that the extended cell restriction is applied.

In addition, in a case where the estimated speed information of its own station apparatus which is estimated by the mobile station apparatus 1 is equal to an extended cell restriction applying speed which is configured for each cell or for each frequency from the base station apparatus 2, the mobile station apparatus 1 may determine that the extended cell restriction is applied. As an example, in a case where the extended cell restriction applying speed is configured to a high speed from the base station apparatus 2, when the estimated speed information of its own station apparatus represents a low speed or a medium speed, the mobile station apparatus 1 may not apply the extended cell restriction, and only when the estimated speed information represents a high speed, the mobile station apparatus 1 may apply the extended cell restriction.

In addition, one piece or a plurality of pieces of physical cell ID information, which indicate that a cell is not suitable as a target cell for a cell selection, are configured from the base station apparatus 2, and the mobile station apparatus 1 may determine that the extended cell restriction is applied. The physical cell ID information may be information for identifying a cell (for example, a pico cell) having a small cell radius. The physical cell ID information may be information indicating a physical cell ID range. In addition, the extended cell restriction is applied in a case where one or a plurality of physical cell ID information, which indicate that a cell is not suitable as a target cell for a cell selection, are configured to the mobile station apparatus 1 from the base station apparatus 2, and information, which indicates that a cell indicated by corresponding physical cell ID information is effective as a suitable cell related to a target cell for a cell selection, is configured.

In addition, in a case where a serving cell (a cell which is camping) of the mobile station apparatus 1 or a serving cell (a cell in which the mobile station apparatus 1 was camping) immediately adjacent to the mobile station apparatus 1 is a cell configured from the base station apparatus 2, the mobile station apparatus 1 may determine that the extended cell restriction is applied. As an example, in a case where physical cell ID information, which indicates a serving cell to which the extended cell restriction is applied from the base station apparatus 2, is configured to the mobile station apparatus 1, and the mobile station apparatus 1 is located in the cell indicated by the physical cell ID information, the mobile station apparatus 1 may apply the extended cell restriction. The physical cell ID information may be information for identifying a cell (for example, a pico cell) having a small cell radius. The physical cell ID information may be information indicating a physical cell ID range. The physical cell ID information indicating a serving cell to which the extended cell restriction is applied, and the physical cell ID information indicating a cell restricted by the extended cell restriction may be independently configured.

In addition, in a case where the mobile station apparatus 1 retains information related to the extended cell restriction (that is, is configured from the base station apparatus 2), the decision of whether or not to apply the extended cell restriction may be configured for each cell or for each frequency from the base station apparatus 2. In this case, when where non-application of the extended cell restriction is configured from the base station apparatus 2, regardless of whether or not the mobile station apparatus 1 retains the information related to the extended cell restriction, the mobile station apparatus 1 may or may not apply the extended cell restriction.

The mobile station apparatus 1 may determine whether or not to apply the extended cell restriction on the basis of a combination of conditions for application of the information related to the above-described extended cell restriction. For example, the mobile station apparatus 1 may determine whether or not to apply the extended cell restriction on the basis of a combination of the estimated speed information and the physical cell ID information. As an example of the combination, in a case where the estimated speed information represents a high speed and the mobile station apparatus 1 is camping in a cell designated by the physical cell ID information, the mobile station apparatus 1 may determine that the extended cell restriction is applied. In addition, the mobile station apparatus 1 may determine that the above-described conditions are effective in the cell selection procedure that is executed when the RRC state transitions from a connection state (connected state) to an idle state. That is, the mobile station apparatus 1 may determine that the above-described conditions are invalid during a cell selection in an initial cell selection procedure.

On the other hand, the mobile station apparatus 1 which does not retain the information related to the extended cell restriction (in which the information is not configured) applies a typical cell restriction in a cell selection (step S102). The typical cell restriction represents restriction information such as access class restriction information that is configured for each access class used to classify access to the mobile station apparatus 1, and cell state information indicating a cell state that is applied to a plurality of the mobile station apparatuses 1 in the entirety of the cells.

The access class restriction information is configured to restrict access (communication) from a specific access class with respect to an access class classified by a call type (normal call, emergency call, and the like) of the mobile station apparatus 1, or a class (a terminal exclusive for an operator, a terminal exclusive for a public utilities, and the like) to which the mobile station apparatus 1 belongs. In addition, for example, in a case where a barred cell, a reserved cell, and the like are configured as cell state information, the access class restriction information is configured to restrict access from other than the mobile station apparatus 1 corresponding to the cell state. For example, in the case of the reserved cell, access of the mobile station apparatus 1 other than in the terminal exclusive for an operator is restricted in the cell.

The mobile station apparatus 1, which determines in step S101 that it is necessary to apply the extended cell restriction, applies the extended cell restriction in a cell selection (step S103). The mobile station apparatus 1 determines a cell that is an application target of the extended cell restriction by several methods as described below.

For example, the mobile station apparatus 1 determines that the extended cell restriction is applied to a cell indicated by the physical cell ID information configured by the base station apparatus 2, and regards the cell as a cell not suitable for a cell selection candidate. In addition, the physical cell ID information may be information indicating a physical cell ID range that includes a plurality of physical cell IDs. A cell indicated by the physical cell ID information may be, for example, a cell (pico cell and the like) having a small cell radius. The physical cell ID information may be individually configured by an RRC message with respect to the mobile station apparatus 1, may be configured for each cell as a part of broadcast information, or may be configured by system parameters with respect to the entirety of a system.

In addition, the mobile station apparatus 1 determines that the extended cell restriction is applied to a cell other than a cell indicated by the physical cell ID information configured by the base station apparatus 2, and regards cells other than the corresponding cell as cells which are not suitable for a cell selection candidate. In addition, the physical cell ID information may be information indicating a physical cell ID range that includes a plurality of physical cell IDs. A cell indicated by the physical cell ID information may be, for example, a cell (macro cell and the like) having a large cell radius. The physical cell ID information may be individually configured by an RRC message with respect to the mobile station apparatus 1, may be configured for each cell as a part of broadcast information, or may be configured by system parameters with respect to the entirety of a system.

In addition, the mobile station apparatus 1 determines that the extended cell restriction is applied with respect to a cell to which designated information is configured by the base station apparatus 2, and regards the cell as a cell which is not suitable for a cell selection candidate. The cell to which the designated information is configured is, for example, a cell to which identification information indicating that the cell is not suitable for a cell selection candidate is configured when the extended cell restriction is applied. The identification information may be individually configured with an RRC message with respect to the mobile station apparatus 1, or may be set for each cell as a part of broadcast information. In a case where the identification information is set as a part of the broadcast information, one bit of coded information, which indicates that a cell is not suitable for a cell selection candidate during application of the information related to the extended cell restriction, is set for each cell by the base station apparatus 2.

In addition, the mobile station apparatus 1 determines that the extended cell restriction is applied to a cell other than cells to which designated information is set by the base station apparatus 2, regards the cell as a cell which is suitable for a cell selection candidate, and regards cells other than the cell as cells which are not suitable for a cell selection candidate. For example, the cell to which designated information is set is a cell, to which identification information indicating that the cell which is suitable for a cell selection candidate during application of the extended cell restriction, is configured. The identification information may be individually configured by an RRC message with respect to the mobile station apparatus 1, or may be configured for each cell as a part of broadcast information. In a case where the identification information is configured as a part of the broadcast information, one bit of coded information, which indicates that a cell which is suitable for a cell selection candidate during application of the information related to the extended cell restriction, is configured for each cell by the base station apparatus 2.

In addition, the mobile station apparatus 1 determines that the extended cell restriction is applied to a cell with the same frequency as a frequency configured by the base station apparatus 2, and regards the cell with the same frequency as the frequency that is configured as a cell that is not suitable for a cell selection candidate. Information that configures a frequency to which the extended cell restriction is applied may be individually configured by an RRC message with respect to the mobile station apparatus 1, or may be configured for each frequency as a part of broadcast information. In a case where the identification information is configured as a part of the broadcast information, one bit of coded information, which indicates that a cell is suitable for a cell selection candidate during application of the information related to the extended cell restriction, is configured for each frequency by the base station apparatus 2.

In addition, the mobile station apparatus 1 determines that the extended cell restriction is applied to a cell with a frequency other than the frequency configured by the base station apparatus 2, regards a cell with the same frequency of the frequency that is configured as a cell which is suitable for a cell selection candidate, and regards cells with a frequency other than the frequency that is configured as cells which are not suitable for a cell selection candidate. The information that configures the frequency to which the extended cell restriction is applied may be individually configured by an RRC message with respect to the mobile station apparatus 1, or may be configured for each frequency as a part of broadcast information. In a case where the identification information is configured as a part of the broadcast information, one bit of coded information, which indicates that a cell which is suitable for a cell selection candidate during application of the information related to the extended cell restriction, is configured for each frequency by the base station apparatus 2.

The mobile station apparatus 1, which applies the extended cell restriction in step S103, also applies a typical cell restriction in step S102.

In step S104, the mobile station apparatus 1 performs cell selection criterion determination on the basis of the cell selection restriction information that is applied. That is, the mobile station apparatus 1, which applies the cell restriction and the extended cell restriction, excludes a cell that matches conditions of cell restriction and extended cell restriction from a cell selection candidate, and performs the cell selection criterion determination in order to select a cell. On the other hand, the mobile station apparatus 1, which applies only the cell restriction, excludes a cell that matches conditions of the cell restriction from a cell selection candidate, and performs the cell selection criterion determination to determine a suitable cell.

The cell selection criterion determination represents a process of regarding a cell, in which a cell measurement result satisfies standard quality and which does not correspond to the cell restriction and the extended cell restriction, as a suitable cell in the mobile station apparatus 1.

The cell that satisfies the standard quality is a cell in which measurement results of at least two different cells satisfy the standard quality in combination with each other. For example, in a case where both a value obtained by subtracting an offset value in a received power, which is provided for notification in advance, from received power of a downlink reference signal (RSRP: Reference Signal Received Power), and a value obtained by subtracting reception quality offset value, which is provided for notification in advance, from reception quality of a downlink reference signal (RSRP: Reference Signal Received Quality) exceed 0

(zero), the corresponding cell is regarded as a cell that satisfies the standard quality, and becomes a cell selection candidate.

In addition, the mobile station apparatus 1 may be also configured to determine whether or not to apply the information related to the cell restriction in step S101 after performing the cell selection criterion determination in step S104.

When being configured as described above, the mobile station apparatus 1 can select a suitable cell by comparing information (detected cell information) of a cell that is detected by cell searching, and information (neighboring cell information) related to cell restriction of a neighboring cell which is acquired from the broadcast information and by excluding a cell not suitable for a cell selection candidate.

The mobile station apparatus 1 according to this embodiment applies the extended cell restriction that is configured from the base station apparatus 2, and thus in addition to the typical cell restriction, a cell not suitable under a specific situation can be excluded from a selection candidate cell. In addition, the base station apparatus 2 according to this embodiment transmits the extended cell restriction to the mobile station apparatus 1 to apply the extended cell restriction with respect to the mobile station apparatus 1, and thus in addition to the typical cell restriction, a cell not suitable under a specific situation can be excluded from a selection candidate cell.

According to the first embodiment, the mobile station apparatus 1 can execute an efficient cell selection procedure in accordance with a neighboring cell environment on the basis of information that is configured from the base station apparatus 2, and thus it is possible to reduce the possibility that a cell not suitable as a cell of a selection destination is selected. In addition, the base station apparatus 2 can execute an efficient cell selection procedure with respect to the mobile station apparatus 1 on the basis of a peripheral environment of its station apparatus, and thus it is possible to reduce the possibility that a cell not suitable as a cell of a selection destination is selected. Accordingly, the probability of success when the mobile station apparatus 1 accesses a cell which is a selection destination is improved, and thus it is possible to improve communication quality.

Second Embodiment

A second embodiment of the invention will be described below.

Cell selection in the RRC connection re-establishment procedure is mainly performed to recover communication in which failure occurs. Accordingly, when a cell selected by the base station apparatus 2 is instructed to the mobile station apparatus 1, success probability of the RRC connection re-establishment procedure may be further improved in comparison to selection of a cell by the mobile station apparatus 1. As a result, in the second embodiment, the following modifications are made with respect to the first embodiment.

A first modification relates to preparation of extended cell restriction that is applied only in the RRC connection re-establishment procedure. That is, the base station apparatus 2 configures first extended cell restriction that is applied in the RRC connection re-establishment procedure and second extended cell restriction that is applied in a case other than the RRC connection re-establishment procedure with respect to the mobile station apparatus 1, and the mobile station apparatus 1 executes the cell selection procedure by applying the first extended cell restriction in the RRC connection re-establishment procedure and applying the second extended cell restriction in a case other than the RRC connection re-establishment procedure. The first extended cell restriction may be a sub-set of the second extended cell restriction.

In addition, the first extended cell restriction and the second extended cell restriction may be actually the same information. At this time, the base station apparatus 2 may not transmit the first extended cell restriction so as to implicitly indicate that the first extended cell restriction and the second extended cell restriction are the same information.

In addition, it is possible to employ a configuration in which either the first extended cell restriction or the second extended cell restriction is not configured. When the first extended cell restriction is not received, the mobile station apparatus 1 performs a cell selection procedure without applying the extended cell restriction in the RRC connection re-establishment procedure. Similarly, when the second extended cell restriction is not received, the mobile station apparatus 1 performs the cell selection procedure without applying the extended cell restriction in a case other than the RRC connection re-establishment procedure.

A second modification relates to addition of information, which identifies an effective range of the first extended cell restriction, as a parameter. For example, the formation which identifies the effective range is an area identifier (area identifier information), and is transmitted as broadcast information from the base station apparatus 2 for each cell. FIG. 5 is an example illustrating a corresponding relationship between parameters in a case where the area identifier and information related to the extended cell restriction are configured to the mobile station apparatus 1 from the base station apparatus 2.

The base station apparatus 2 manages a set of the area identifier and the information related to the extended cell restriction, lists up the set, and transmits the list to the mobile station apparatus 1. The base station apparatus 2 may perform addition, deletion, and modification with respect to a parameter of configured extended cell restriction, by designating an area identifier corresponding to the configured extended cell restriction.

At this time, the mobile station apparatus 1 acquires the area identifier from a cell that is detected in the RRC connection re-establishment procedure. In addition, in a case where the area identifier is Area Identifier 1, the mobile station apparatus 1 performs a cell selection procedure by applying Extended Cell Restriction 1 as corresponding extended cell restriction. In addition, in a case where the area identifier that is acquired is Area Identifier 2, the mobile station apparatus 1 performs a cell selection procedure by applying Extended Cell Restriction 2 as corresponding extended cell restriction.

In addition, in a case where the extended cell restriction corresponding to the area identifier that is acquired is not configured, the mobile station apparatus 1 performs a cell selection procedure by applying only the cell restriction. In addition, in a case where a cell to which the area identifier is not configured is selected, the mobile station apparatus 1 performs a cell selection procedure by applying only the cell restriction.

Figure 6:
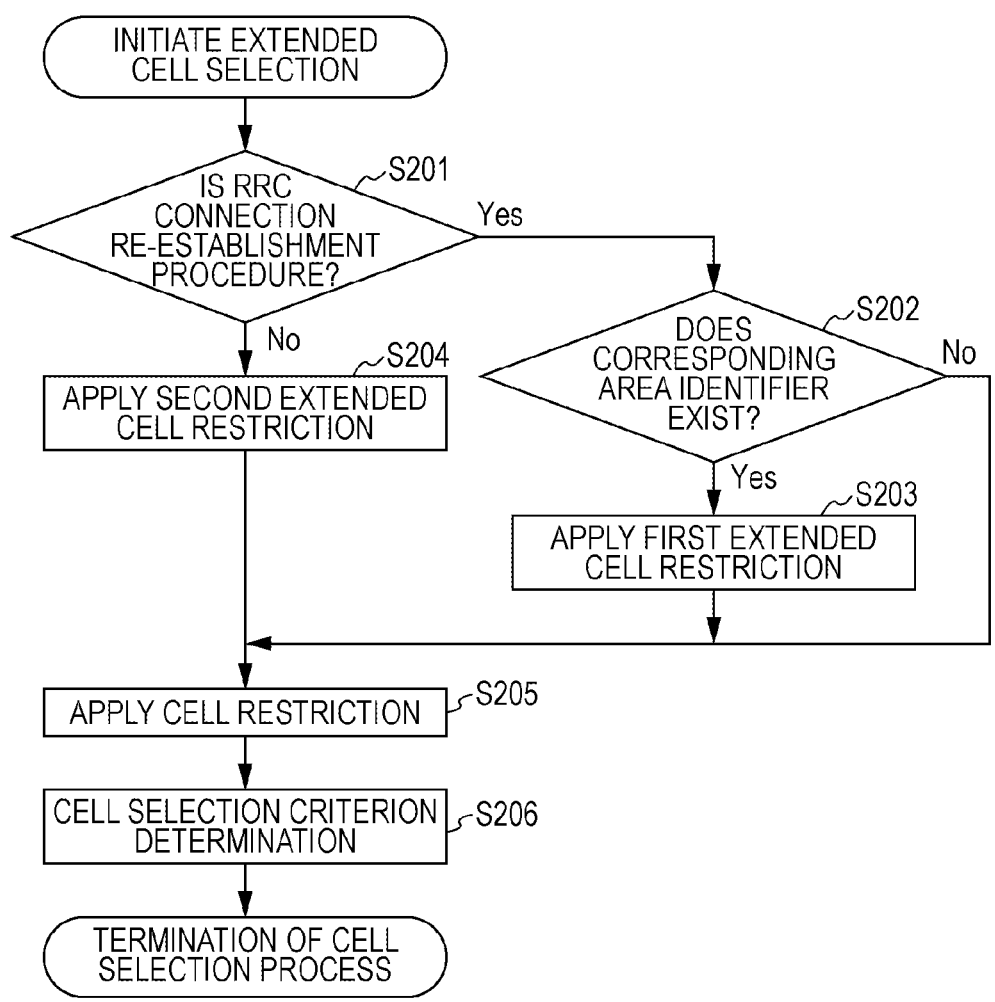
FIG. 6 is a flowchart illustrating an example of a cell selection process of a mobile station apparatus according to a second embodiment of the invention.

A cell selection processing method according to the second embodiment of the invention will be described with reference to a flowchart in FIG. 6.

First, in step S201, the mobile station apparatus 1, which initiates a cell selection process, determines whether or not cell selection corresponds to a cell selection procedure in the RRC connection re-establishment procedure. In addition, in a case where the cell selection procedure that is performed is the cell selection procedure in the RRC connection re-establishment procedure, the mobile station apparatus 1 determines whether or not information related to extended cell restriction (first extended cell restriction) corresponding to an area identifier of an acquired cell is configured (is retained) (step S202). In a case where the extended cell restriction corresponding to the area identifier that is acquired is configured, the mobile station apparatus 1 determines whether or not to apply the corresponding first extended cell restriction, and applies the first extended cell restriction as necessary (step S203). In addition, the mobile station apparatus 1 subsequently determines whether or not to apply the normal cell restriction, and applies the normal cell restriction as necessary (step S205).

On the other hand, in a case where the extended cell restriction corresponding to the area identifier that is acquired is not configured, or in a case where the area identifier is not acquired, the mobile station apparatus 1 determines whether or not to apply the normal cell restriction, and applies the normal cell restriction as necessary (step S205).

In addition, in a case where the cell selection procedure that is executed in step S201 is not the cell selection procedure in the RRC connection re-establishment procedure, that is, in a case of an initial cell selection procedure and in a case of a cell selection procedure that is performed after termination of communication with the base station apparatus 2, the mobile station apparatus 1 determines whether or not to apply the second extended cell restriction and applies the second extended cell restriction as necessary (step S204). In addition, in a case where the second extended cell restriction is not configured, the mobile station apparatus 1 skips the process in step S204. In addition, the mobile station apparatus 1 subsequently applies the normal cell restriction (step S205).

In step S206, the mobile station apparatus 1 performs a process of determining a cell selection criterion on the basis of cell selection restriction information that is applied. That is, the mobile station apparatus 1 that applies the cell restriction and the extended cell restriction (the first extended cell restriction or the second extended cell restriction) performs the cell selection criterion determination by excluding a cell that matches conditions of the cell restriction and the extended cell restriction from a cell selection candidate, and selects a cell. On the other hand, the mobile station apparatus 1 that applies only the cell restriction performs the cell selection criterion determination by excluding a cell that matches conditions of the cell restriction from the cell selection candidate, and determines a suitable cell. Here, details of determination of application of the extended cell restriction, details of the information related to the extended cell restriction, and details of the cell selection criterion determination are the same as in the content described in the first embodiment, and thus description thereof will be omitted.

In addition, the mobile station apparatus 1 may be also configured to perform determination of whether or not it is the RRC connection re-establishment procedure in step S201 after performing the cell selection criterion determination in step S206.

When being configured as described above, the mobile station apparatus 1 can select a suitable cell by comparing information (detected cell information) of a cell that is detected by cell searching, and information (neighboring cell information) related to cell restriction of a neighboring cell which is acquired from the broadcast information for each area that is configured, and by excluding a cell not suitable for a cell selection candidate for each area.

The mobile station apparatus 1 according to this embodiment applies the extended cell restriction that is configured from the base station apparatus 2 in a state in which classification is made between a case of the RRC connection re-establishment and the other cases, and thus in addition to the normal cell restriction, a cell not suitable under a specific situation can be excluded from a selection candidate cell. In addition, the mobile station apparatus 1 according to this embodiment can apply the extended cell restriction for each area. In addition, the base station apparatus 2 according to this embodiment transmits a plurality of extended cell restriction to the mobile station apparatus 1 to apply the extended cell restriction with respect to the mobile station apparatus 1 on the basis of the case of the RRC connection re-establishment and the other cases, and thus in addition to the normal cell restriction, a cell not suitable under a specific situation can be excluded from a selection candidate cell. In addition, the base station apparatus 2 according to this embodiment can configure the extended cell restriction, which is different in each area, with respect to the mobile station apparatus 1.

According to the second embodiment, the mobile station apparatus 1 can perform an efficient cell selection procedure in accordance with a neighboring cell environment by determining the RRC connection re-establishment procedure and the other procedures on the basis of information that is configured from the base station apparatus 2, and thus it is possible to reduce a possibility that a cell not suitable as a cell of a selection destination is selected. In addition, the base station apparatus 2 can allow the mobile station apparatus 1 to determine the RRC connection re-establishment procedure and the other procedures and to perform an efficient cell selection procedure based on a peripheral environment of its own station apparatus, and thus it is possible to reduce a possibility that a cell not suitable as a cell of a selection destination is selected. As a result, success probability when the mobile station apparatus 1 accesses a cell of a selection destination is improved, and thus it is possible to improve communication quality.

In addition, the above-described embodiments are illustrative only, and the invention may be realized by using various modifications and substituent examples. For example, the uplink transmission method may be applied to an arbitrary communication system of an FDD (frequency division duplex) method and a TDD (time division duplex) method. In addition, measurement values of the downlink may be used instead of the path loss or the other measurement values (SIR, SINR, RSRP, RSRQ, RSSI, and BLER), and a plurality of these measurement values may also be used in combination. In addition, respective parameter names described in the embodiments are given for convenience explanation, and even when parameter names in practical use and parameter names of the embodiments of the invention are different from each other, this difference does not have an effect on the gist of the invention which is claimed by the embodiments of the invention.

In addition, the mobile station apparatus 1 is not limited to a mobile terminal, and the embodiments of the invention may be realized by a configuration in which the function of the mobile station apparatus 1 is implemented in a fixed terminal, and the like. The mobile station apparatus is also referred to as a user terminal, a terminal apparatus, a communication terminal, a mobile apparatus, a mobile station, user equipment (UE), and a mobile station (MS). The base station apparatus is also referred to as a radio base station apparatus, a base station, a radio base station, a fixed station, Node-B (NB), evolved Node-B (eNB), a base transceiver station (BTS), and a base station (BS).

In addition, for convenience of explanation, the mobile station apparatus 1 and the base station apparatus 2 of the embodiments are described with reference functional block diagrams. However, the methods or steps of algorithm for realizing the function of each portion of the mobile station apparatus 1 and the base station apparatus 2, or a part of the function may be directly specified by hardware and a software module executed by a processor, or a combination of two of these. In a case where the function is implemented by software, the function is retained or transmitted as one or more commands or codes on a computer-readable recording medium. The computer-readable recording medium includes both a communication medium including a medium that assists portability of a computer program from an arbitrary site to another site, and a computer recording medium.

In addition, the control of the mobile station apparatus 1 or the base station apparatus 2 may be performed by recording one or more commands or codes on the computer-readable recording medium and by allowing the one or more commands or codes that are recorded on the recording medium to be read by a computer system for execution. In addition, it is assumed that the "computer system" stated here includes OS or hardware such as peripherals.

The operation described in the respective embodiment of the invention may be realized by a program. A program that operates in the mobile station apparatus 1 and the base station apparatus 2 according to the respective embodiments of the invention is a program (program allowing a computer to operate) that controls CPU and the like to realize the function of the respective embodiments of the invention. In addition, the information that is dealt with these apparatuses is temporarily accumulated in RAM during processing, and is stored in various kinds of ROM or HDD. The information is read out by CPU as necessary, and correction and writing-in are performed. In addition, the function of the embodiments is realized by executing the program, and the function of the respective embodiments of the invention may be realized by processing in combination with an operating system, other application programs, and the like on the basis of an instruction of the program.

In addition, the "computer-readable recording medium" means a portable medium such as a semiconductor medium (for example, RAM, a non-volatile memory card, and the like), an optical recording medium (for example, DVD, MO, MD, CD, BD, and the like), and a magnetic recording medium (for example, a magnetic tape, flexible disk, and the like), and a storage apparatus such as a disk unit that is embedded in a computer system. In addition, it is assumed that the "computer-readable recording medium" includes dynamic retention of a program for a short time similar to a communication line in a case of transmitting a program over a communication line, for example, a network such as Internet or a communication line such as a telephone line, and retention of the program for a certain time similar to a volatile memory inside a computer system that becomes a server or a client in the case of the dynamic retention.

In addition, the program may be configured to realize a part of the above-described function, or may be configured to realize the above-described function in a combination with a program that is already recorded in a computer system.

In addition, the respective functional blocks or characteristics of the mobile station apparatus 1 and the base station apparatus 2 that are used in the respective embodiments may be implemented or executed by a general-purpose processor, a digital signal processor (DSP), an application-specific integrated circuit (ASIC), and a field programmable gate array signal (EPGA) which are designed to execute the above-described function, other programmable logic apparatuses, discrete gates or transistor logics, discrete hardware components, or a combination of these. As the general-purpose processor, a microprocessor is possible, but this processor may be a processor, a controller, a micro controller, or a state machine of an existing type. The general-purpose processor or the above-described respective circuits may be configured as a digital circuit, or may be configured as an analog circuit.

In addition, the processor may be mounted as an assembly of computing apparatuses. Examples of the assembly include combinations of DSP and the microprocessor, a plurality of microprocessors, one or more microprocessors connected to a DSP core, and other combinations of these configurations.

Hereinbefore, the embodiments of the invention have been described in detail with reference to specific examples, but it is apparent that the gist of the respective embodiments and claims of the invention are not limited to the specific examples. That is, the description of this specification is illustrative only, and any limitation is not applied to the respective embodiments of the invention.

REFERENCE SIGNS LIST

1: Mobile station apparatus
2: Base station apparatus
101, 201: Reception unit
102, 202: Demodulation unit
103, 203: Decoding unit
104: Measurement processing unit
105, 204: Control unit
106: Uplink buffer control unit
107, 205: Coding unit
108, 206: Modulation unit
109, 207: Transmission unit
110: Uplink radio resource request control unit
111: Random access control unit
112, 208: Higher layer
209: Network signal transmission and reception unit

The invention claimed is:
1. A terminal apparatus that communicates with a base station apparatus, the terminal apparatus comprising:
receiving circuitry configured to receive first information and second information, wherein
the first information and the second information are used during cell selection,
the first information indicates a restriction corresponding to an access class of the terminal apparatus as a cell status, and
the terminal apparatus determines to use the second information as a parameter for the cell selection based on a condition of the terminal apparatus; and
selecting circuitry configured to:
perform cell selection by using the first information and the second information, in a case that the terminal apparatus determines to use the second information, and
perform the cell selection by using the first information, in a case that the terminal apparatus determines not to use the second information.

2. The terminal apparatus according to claim 1,
wherein the selecting circuitry is further configured to perform the cell selection using the second information on the basis of third information which is received from the base station apparatus and relates to conditions of using the second information.

3. The terminal apparatus according to claim 2,
wherein in cells to which the first information and the second information are applied, a cell, to which access of the terminal apparatus is not restricted and in which a measurement result satisfies predetermined quality, is set as a candidate for a candidate for a suitable cell.

4. The terminal apparatus according to claim 1,
wherein the second information is acquired from broadcast information of a cell that is detected.

5. A base station apparatus that communicates with a terminal apparatus, the base station apparatus comprising:
transmitting circuitry configured to transmit first information, second information, and third information wherein
the first information and the second information are used during cell selection,
the first information indicates a restriction corresponding to an access class of the terminal apparatus as a cell status,
the second information is allowed to be determined to use as a parameter for the cell selection based on a condition of the terminal apparatus, and
the third information is related to conditions allowing the terminal apparatus to determine whether or not to use the second information.

6. A cell selection method of a terminal apparatus that communicates with a base station apparatus, the cell selection method comprising:
receiving first information and second information, wherein
the first information and the second information are used during cell selection,
the first information indicates a restriction corresponding to an access class of the terminal apparatus as a cell status, and
the terminal apparatus determines to use the second information as a parameter for the cell selection based on a condition of the terminal apparatus;
performing cell selection by using the first information and the second information, in a case that the terminal apparatus determines to use the second information, and
performing the cell selection by using the first information, in a case that the terminal apparatus determines not to use the second information.

7. A cell selection method of a base station apparatus that communicates with a terminal apparatus,
the cell selection method comprising:
transmitting first information, second information, and third information wherein
the first information and the second information are used during cell selection,
the first infatuation indicates a restriction corresponding to an access class of the terminal apparatus as a cell status,
the second information is allowed to be determined to use as a parameter for the cell selection based on a condition of by the terminal apparatus, and
the third information is related to conditions allowing the terminal apparatus to determine whether or not to use the second information.

8. An integrated circuit mounted on a terminal apparatus that communicates with a base station apparatus, the integrated circuit allowing the terminal apparatus to execute at least:
a function of receiving first information and second information, wherein
the first information and the second information are used during cell selection,
the first information indicates a restriction corresponding to an access class of the terminal apparatus as a cell status, and
the terminal apparatus determines to use the second information as a parameter for the cell selection based on a condition of the terminal apparatus; and
a function of performing cell selection by using the first information and the second information, in a case that the terminal apparatus determines to use the second information, and
a function of performing the cell selection by using the first information, in a case that the terminal apparatus determines not to use the second information.

9. An integrated circuit mounted on a base station apparatus that communicates with a terminal apparatus,
the integrated circuit allowing the base station apparatus to execute at least:
a function of transmitting first information, second information, and third information wherein
the first information and the second information are used during cell selection,
the first information indicates a restriction corresponding to an access class of the terminal apparatus as a cell status,
the terminal apparatus determines to use the second information as a parameter for the cell selection based on a condition of the terminal apparatus, and
the third information is related to conditions allowing the terminal apparatus to determine whether or not to use the second information.

* * * * *